United States Patent
Yang et al.

(10) Patent No.: US 10,468,906 B2
(45) Date of Patent: Nov. 5, 2019

(54) OPTICAL CHARGING SYSTEM WITH INTEGRATED SENSOR AND POWER RECEIVER

(71) Applicant: Analog Devices Global, Hamilton (BM)

(72) Inventors: Hua-Jung Yang, Lexington, MA (US); Suyi Yao, Shanghai (CN)

(73) Assignee: Analog Devices Global, Hamilton (BM)

( * ) Notice: Subject to any disclaimer, the term of this patent is extended or adjusted under 35 U.S.C. 154(b) by 221 days.

(21) Appl. No.: 15/415,055

(22) Filed: Jan. 25, 2017

(65) Prior Publication Data

US 2018/0191192 A1    Jul. 5, 2018

Related U.S. Application Data

(63) Continuation of application No. PCT/CN2016/112899, filed on Dec. 29, 2016.

(51) Int. Cl.
| | |
|---|---|
| *H02J 7/35* | (2006.01) |
| *H02J 7/00* | (2006.01) |
| *H02J 50/80* | (2016.01) |
| *H02J 50/30* | (2016.01) |

(52) U.S. Cl.
CPC .............. *H02J 7/355* (2013.01); *H02J 7/007* (2013.01); *H02J 7/0052* (2013.01); *H02J 50/30* (2016.02); *H02J 50/80* (2016.02); *H02J 2007/0059* (2013.01); *H02J 2007/0062* (2013.01)

(58) Field of Classification Search
CPC ..... H02J 7/355; H02J 2007/0059; H02J 50/30
USPC .......................................... 320/101, 114, 162
See application file for complete search history.

(56) References Cited

U.S. PATENT DOCUMENTS

| | | |
|---|---|---|
| 6,650,085 B2 | 11/2003 | Lau et al. |
| 7,514,899 B2 | 4/2009 | Deng-Peng |
| 2003/0231001 A1 | 12/2003 | Bruning |
| 2011/0050164 A1* | 3/2011 | Partovi .................. H01F 5/003 320/108 |

(Continued)

OTHER PUBLICATIONS

"WI-Charge to Power With Light", (2016), 2 pgs.

(Continued)

*Primary Examiner* — Edward Tso
*Assistant Examiner* — Aaron Piggush
(74) *Attorney, Agent, or Firm* — Schwegman Lundberg & Woessner, P.A.

(57) ABSTRACT

Embodiments of the disclosure can provide an optical charging system with an integrated sensor and power receiver. An electronic device (e.g., a wearable) can include an optical sensor for performing photometric measurements. A photodiode of the sensor can be shared and used for generating an electrical signal when exposed to a light source (e.g., LED) of a light power transmitter. The electrical signal can be conditioned by a power management circuit and can be used to charge a device battery. The light power transmitter can include a photodiode, which can be used for establishing a connection with the device using an optical signal emitted by a light source of the optical sensor. The light power transmitter can be power by, e.g., a USB connection. The intensity of the power transmitter light source can be regulated via a feedback signal from the device, based on the battery charging status.

20 Claims, 6 Drawing Sheets

(56) References Cited

U.S. PATENT DOCUMENTS

2014/0247152 A1* 9/2014 Proud .................... H04W 4/70
                                                340/870.07

OTHER PUBLICATIONS

Dolcourt, Jessica, "Charge all your devices at once, using infrared light (hands-on)—New tech will charge multiple devices in a room, via transmitters that will one day hide in your light fixtures.", (Mar. 10, 2015), 6 pgs.

Liu, Yunxin, et al., "AutoCharge: Automatically Charge Smartphones Using a Light Beam", (Jan. 1, 2015), 12 pgs.

Savage, Neil, "Wireless Solar Charging Made Easier—Using the same technology to build solar cells and the circuits that transmit their power could lead to cheap charging stations", (Jun. 20, 2012), 2 pgs.

* cited by examiner

OPTICAL CHARGING SYSTEM WITH INTEGRATED SENSOR AND POWER RECEIVER

FIELD OF THE DISCLOSURE

The disclosure relates generally to the field of wireless charging of electronic devices. More specifically, the disclosure relates to an optical charging system.

BACKGROUND

There is an increasing demand for portable electronic devices, such as wearable devices, mobile communication devices, digital cameras and so forth, to be implemented using a rechargeable battery in sealed and waterproof housing with a minimal form factor. Traditional portable device charging techniques, such as charging using a Universal Serial Bus (USB) port, can be difficult to implement due to smaller contact area for the USB charging connection as device form factor is reduced. Additionally, any opening in the device housing for the USB charging connection can limit the device waterproof capabilities.

Other existing battery charging techniques, such as inductive charging, may also be inefficient due to a coil surface area generally used for inductive charging. Inductive charging may also be inefficient due to the amount of heat generated during charging as well as the alignment generally used between the device and the inductive charger. Other wireless charging techniques can be implemented using Micro Electro Mechanical System (MEMS) minor, which can be prohibitive due to the high cost of the MEMS mirror.

SUMMARY OF THE DISCLOSURE

Embodiments of the disclosure can provide an optical charging system with an integrated sensor and power receiver. An electronic device (e.g., a wearable) can include an optical sensor for performing photometric measurements. A photodiode of the sensor can be shared and used for generating an electrical signal when exposed to a light source (e.g., LED) of a light power transmitter. The electrical signal can be conditioned by a power management circuit and can be used to charge a device battery. The light power transmitter can include a photodiode, which can be used for establishing a connection with the device using an optical signal emitted by a light source of the optical sensor. The light power transmitter can be power by, e.g., a USB connection. The intensity of the power transmitter light source can be regulated via a feedback signal from the device, based on the battery charging status.

In certain embodiment, an electronic device can include a charge storage device and an optical sensor. The optical sensor can include an LED and a photodiode. The LED can be configured to emit light in connection with a photometric measurement. The photodiode can be configured to generate a first electrical signal in response to light received in relation to the photometric measurement. The photodiode can be configured to generate a second electrical signal at least in part including energy converted from light received from an optical charger. The electronic device can further include a power management circuit configured to receive the second electrical signal and charge the charge storage device at least in part using energy from the second electrical signal.

In certain embodiments, an optical charger can include a light source configured to emit light and an optical data receiver. The optical data receiver can be configured to receive a feedback signal from an electronic device, the feedback signal indicative of a charge status of a battery of the electronic device. The optical charger can include a driver circuit configured to activate the light source using a power signal from a power source, the light source having a light intensity based on the received feedback signal.

In certain embodiments, a method for optical charging of an electronic device is provided. The method can include detecting a current charge level of a battery of the electronic device. A feedback signal can be generated based on the current charge level of the battery. The feedback signal can be communicated to an optical charger via an optical transmitter of the electronic device. In response to the communicating, a light signal can be received from the optical charger. Intensity of the light signal can be based on the feedback signal. The light signal can be converted to an electrical signal. The battery can be charged using the electric signal.

In another example, at least one computer-readable storage medium can be provided to include instructions that, when executed on a central processing unit (CPU) of an embedded sensor system, cause the CPU to . . . .

This overview is intended to provide an overview of subject matter of the present patent application. It is not intended to provide an exclusive or exhaustive explanation of the invention. The detailed description is included to provide further information about the present patent application.

Figure 1:
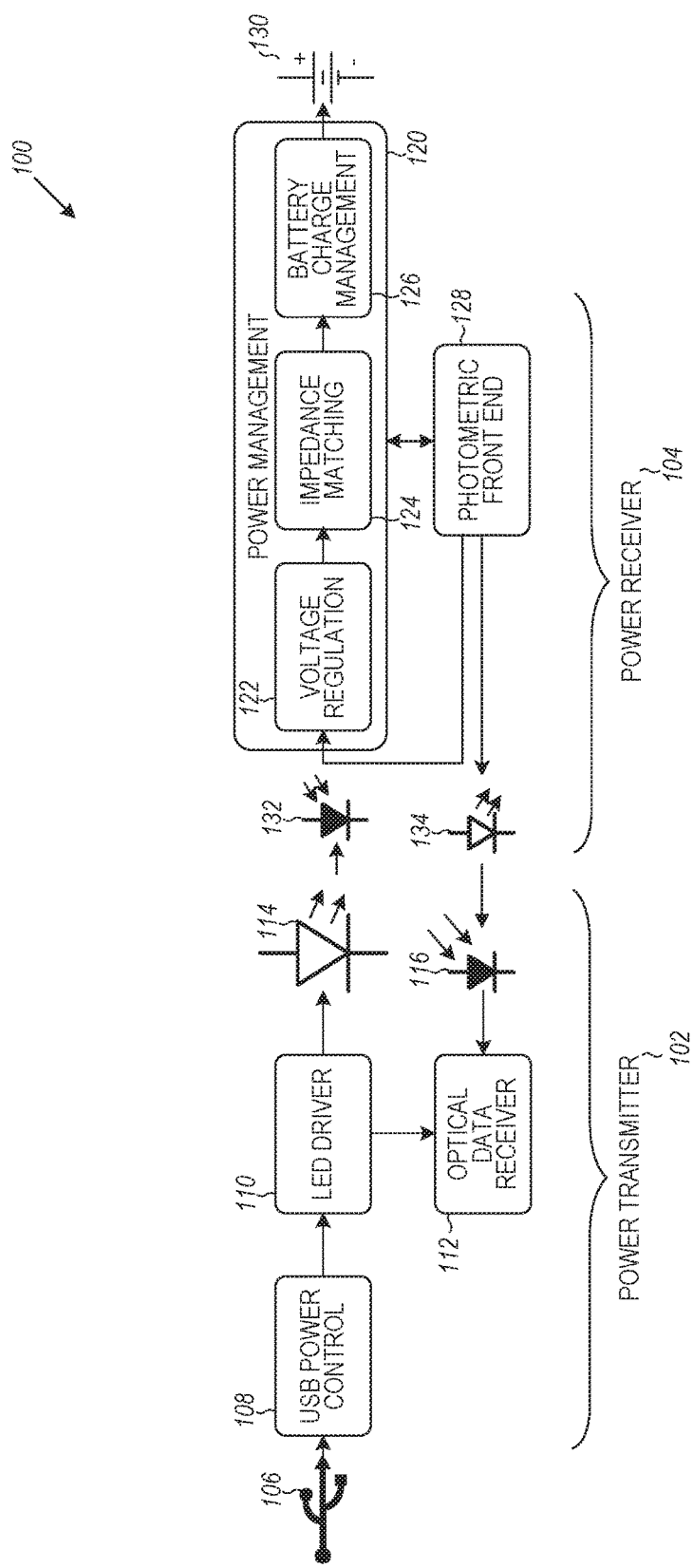
FIG. 1 depicts an optical charging system with integrated sensor and power receiver, in accordance with an example embodiment.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In accordance with proposed techniques, an electronic device can include an integrated sensor (e.g., for performing photometric measurements, such as heart rate measurement of a user), which can be shared with a power receiver for optical charging of the device. More specifically, light received from a light power transmitter can be converted to an electrical signal using a photovoltaic cell or a photodiode of the integrated sensor. The electrical signal can be further conditioned (e.g., voltage regulation and impedance matching) and then used for charging a battery of the electronic device. A light source within the integrated sensor (e.g., a light emitting diode, or LED) can be used to communicate optical signals to the light power transmitter for establishing a communication link. The light power transmitter can include a light source (e.g., LED) and a photodiode (or photovoltaic cell), and can be powered via a separate power source (e.g., via a uniform serial bus (USB) connection). The optical communication link between the power receiver and the power transmitter can be further used for communicating battery charge status signals so that the intensity of the light generated by the light power transmitter can be adjusted to control the battery charge. In this regard, device charging can be performed while maintaining a sealed and waterproof device housing and while sharing an existing device sensor system. Additionally, the optical charging system discussed herein is space-efficient as it does not use an inductive coil, and device charging can still take place with a wider tolerance to placement position of the light transmitter in relation to the device.

FIG. 1 depicts an optical charging system with integrated sensor and power receiver, in accordance with an example embodiment. Referring to FIG. 1, there is illustrated an optical charging system 100, including a power transmitter 102 and a power receiver 104. The power transmitter 102 may comprise suitable circuitry, logic, interfaces and/or code and can be configured for optical communication with the power receiver 104 to provide optical (light) signals for charging the battery (e.g., 130) of the power receiver, or to receive feedback signals indicative of the battery charge status.

The power transmitter can include a power control block 108, an LED driver block 110, and an optical data receiver block 112. The power transmitter 102 can further include a light source 114, such as an LED, and a photodiode (or a photovoltaic cell) 116. The power control block 108 may comprise suitable circuitry, logic, interfaces and/or code, and can be configured to limit amount of current drawn from power port 106. In an example, the power port 106 can be a USB port configured to supply power in connection with one or more USB-related protocols, such as USB 1.0, USB 2.0, USB 3.0, or another type of connection protocol.

The LED driver block 110 may comprise suitable circuitry, logic, interfaces and/or code, and can be configured to adjust current and/or voltage supplied to the LED 114 so as to adjust the transmitted light power density. The optical data receiver 112 may comprise suitable circuitry, logic, interfaces and/or code, and can be configured to communicate with the power receiver 104 via the photodiode 116 (e.g., receive feedback information regarding battery status) to activate or deactivate optical charging via the LED 114, or adjust the transmitted light power density using the LED driver block 110. For example, the optical receiver 112 can include one or more analog-to-digital converters (ADCs), which can be used to monitor voltage signals generated by the photodiode 116, and generate one or more control signals based on the voltage signals. The control signals can be communicated to the LED driver block 110 for, e.g., adjusting voltage and/or current supplied to the LED 114.

Figure 2:
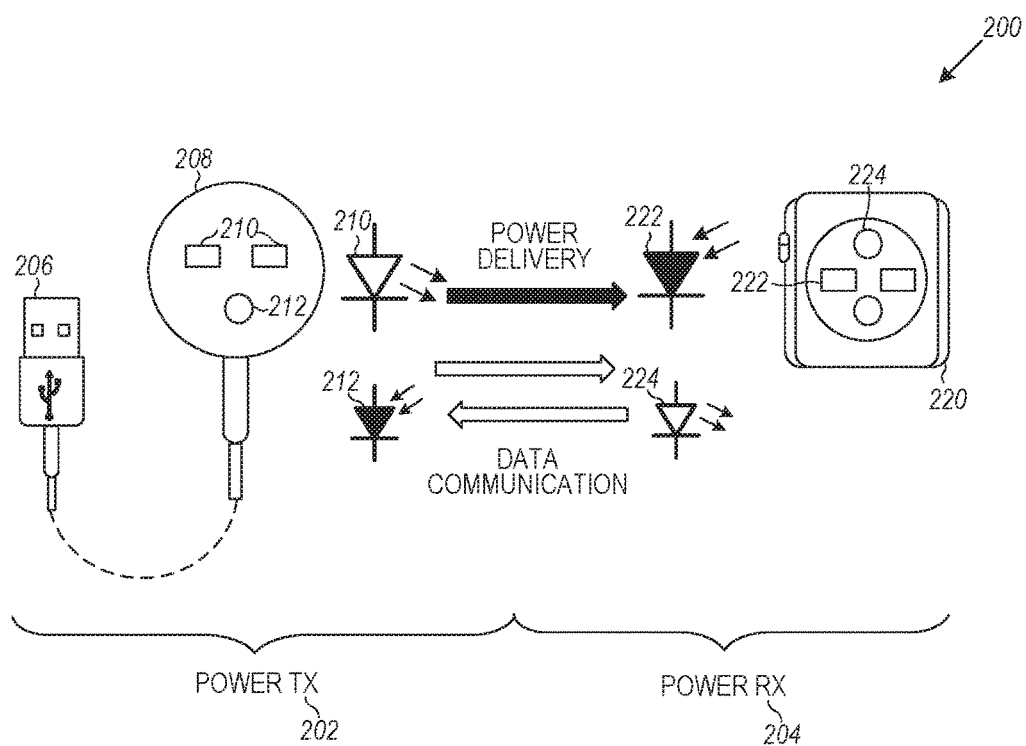
FIG. 2 depicts an example wearable device with an optical charging system, in accordance with an example embodiment.

The power receiver 104 can include a power management block 120 and a photometric front end block 128. The photometric front end 128 can also include a photodiode 132 and an LED 134. The photometric front end 128 and the power management block 120 can be implemented within a battery-powered electronic device with sensor capabilities (e.g., as illustrated in FIG. 2). For example, the photometric front end 128 can be configured to perform photometric measurements using the LED 134 and the photodiode 132. In an example, the photometric measurements can include photoplethysmography measurement to determine a heart rate of a user wearing the electronic device. Other types of measurements may be performed by the photometric front end as well, using the LED 134 and the photodiode 132. Other light sources may be used in place of the LED 134. Additionally, a photovoltaic cell can be used in lieu of the photodiode 132.

Figure 3A:
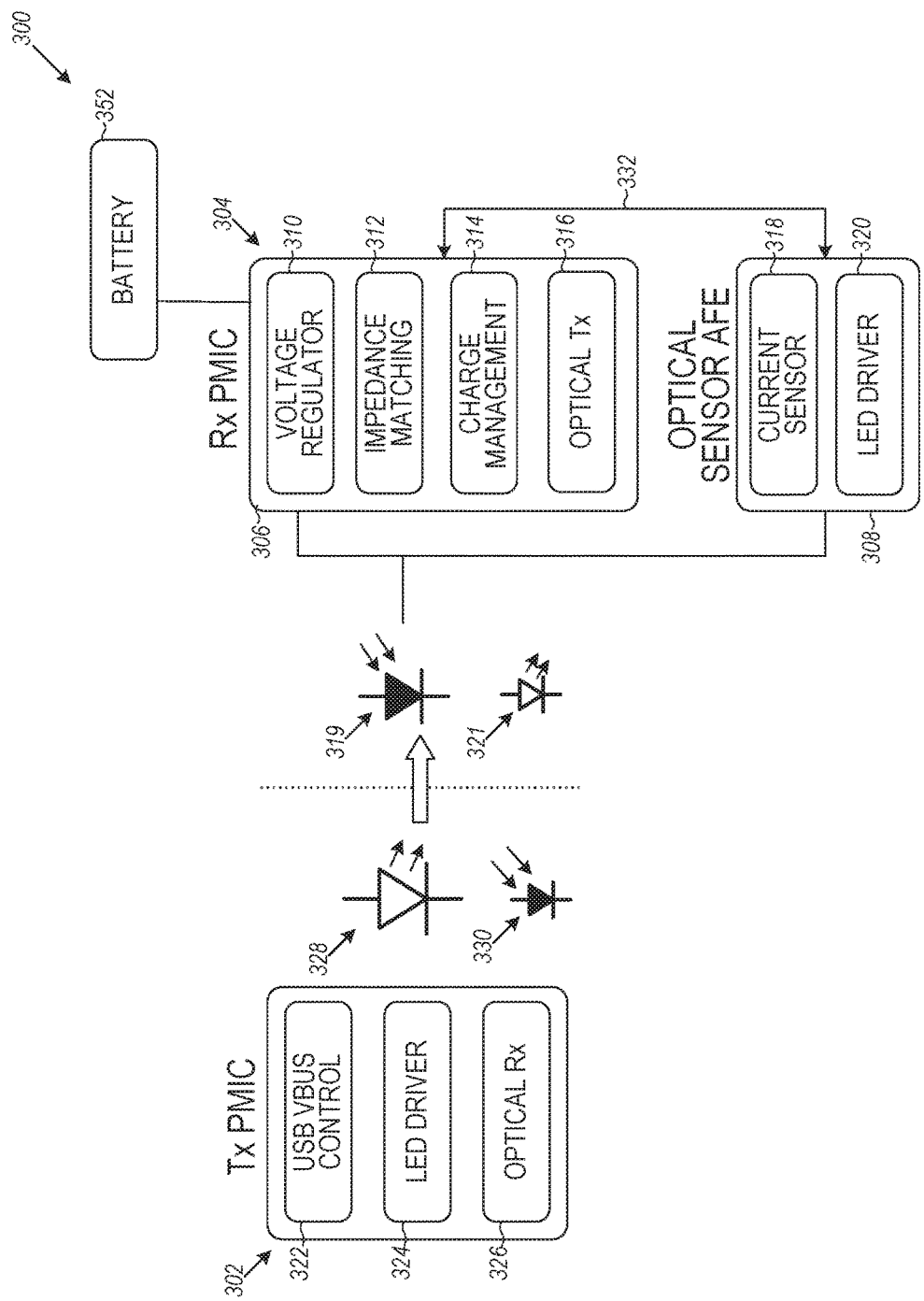
FIG. 3A depicts an example optical charging system with shared use of a sensor photodiode, in accordance with an example embodiment.
Figure 3B:
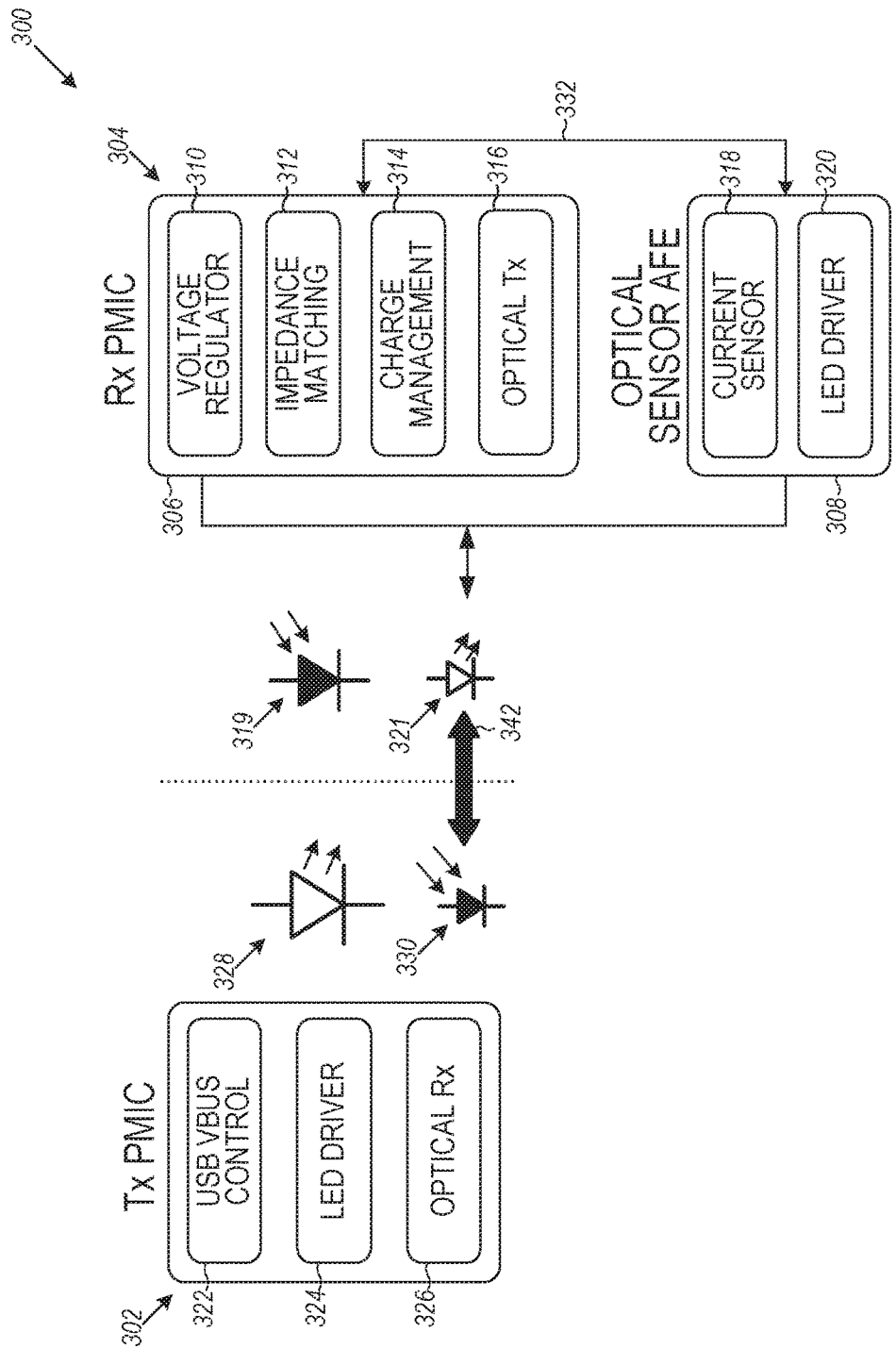
FIG. 3B depicts an example optical charging system configured to establish a link between a power receiver and a power transmitter via optical communications, in accordance with an example embodiment.
Figure 3C:
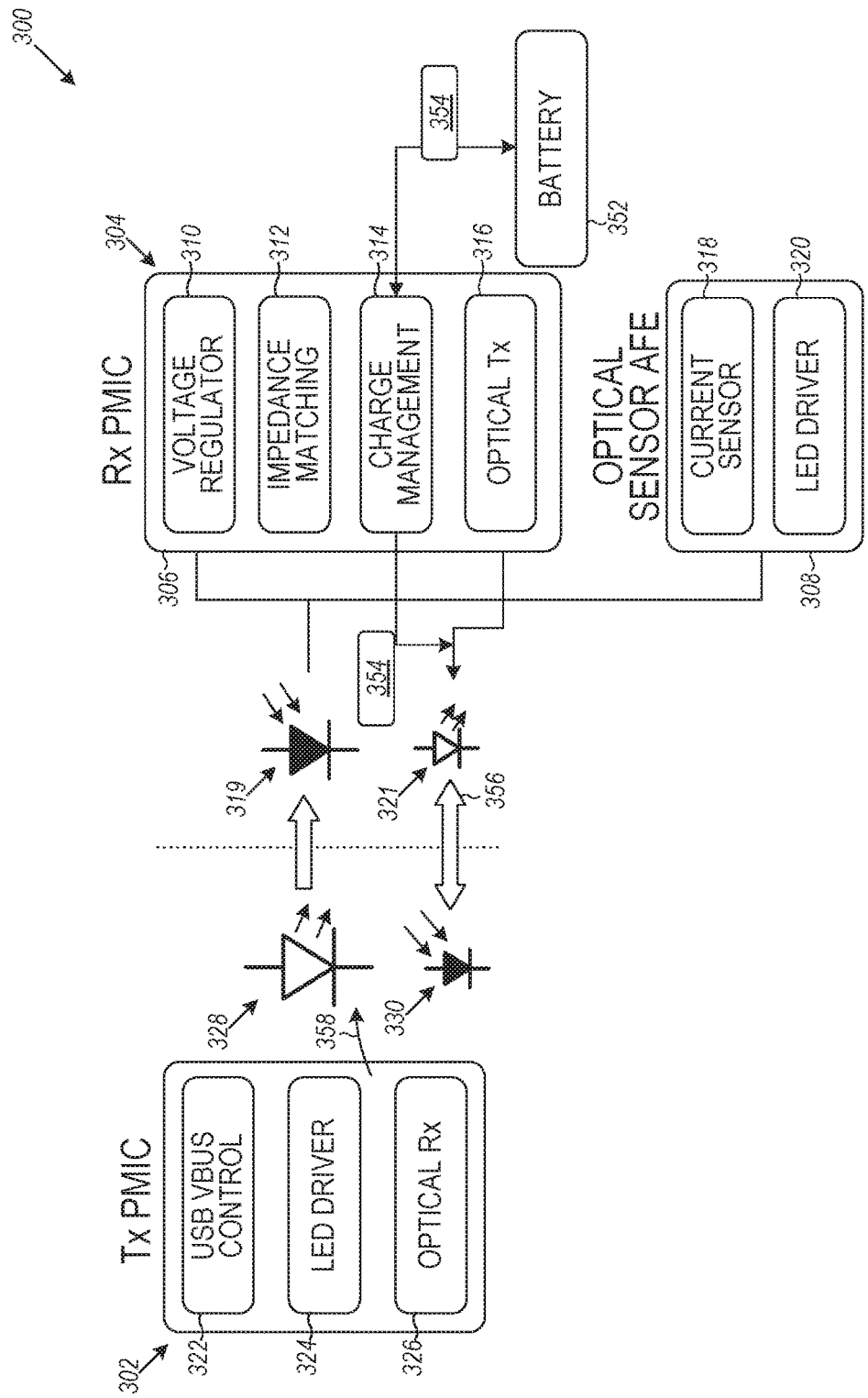
FIG. 3C depicts an example optical charging system with feedback control using optical communications, in accordance with an example embodiment.

In an example, the photometric front end 128 can also include an optical transmitter (e.g., as illustrated in FIG. 3A, FIG. 3B or FIG. 3C). The optical transmitter may comprise suitable circuitry, logic, interfaces and/or code, and can be configured to generate one or more optical feedback signals for transmission to the power transmitter 102 via the LED 134. In this regard, the optical transmitter can include one or more digital-to-analog converters (DACs), which can be used to generate the feedback signals (e.g., as explained in greater detail herein below, in reference to FIG. 3B and FIG. 3C). The optical transmitter may be part of the photometric front end 128 or the power management block 120.

In an example, the photometric front end 128 can be configured to generate an electrical signal using the photodiode 132 (e.g., when the photodiode 132 is exposed to a light signal generated by the LED 114 of the power transmitter 102). The power management block 120 can include a voltage regulation block 122, an impedance matching block 124, and a charge management block 126. The voltage regulation block 122 may comprise suitable circuitry, logic, interfaces and/or code, and can be configured to perform signal conditioning (e.g., voltage regulation) on the electrical signal generated by the photodiode 132 and received from the photometric front end 128.

The impedance matching block 124 may comprise suitable circuitry, logic, interfaces and/or code, and can be configured to perform impedance matching by regulating the voltage of the electrical signal generated by the photodiode 132 to a highest power extracting point so as to capture a maximum amount of energy emitted by the LED 114.

The charge management block 126 may comprise suitable circuitry, logic, interfaces and/or code, and can be configured to control charging the battery 130 using the conditioned and impedance matched electrical signal received from the impedance matching block 124. For example, the charge management block 126 can monitor the charge status of the battery 130 to prevent overcharge or over-discharge. In instances when the battery charge status indicates a charge above a first pre-determined threshold, a first control signal may be generated by the charge management block 126 and communicated via the LED 134 of the photometric front end 128 (or the optical transmitter, as illustrated in FIG. 3C) to the power transmitter 102 to stop illumination by the LED 114. In instances when the battery charge status indicates a charge below a second pre-determined threshold, a second control signal may be generated by the charge management block 126 and communicated via the LED 134 of the photometric front end 128 (or the optical transmitter, as illustrated in FIG. 3C) to the power transmitter 102 to initiate charging by turning the LED 114 ON, or by adjusting the light intensity of the LED 114. The charge management block 126 may also detect one or more operating conditions (e.g., operating temperature variance of the receiver 104 or alignment variance) and generate a control signal for adjusting the intensity of the LED 114.

FIG. 2 depicts an example wearable device with an optical charging system, in accordance with an example embodiment. Referring to FIG. 2, the optical charging system 200 can include an electronic device 220 and a light power transmitter (or charger) 208. The electronic device 220 can be a wearable device, such as a smart watch. The device 220 can include a power receiver 204, which can be similar to the power receiver 104. The charger 208 can include a power transmitter 202, which can be similar to the power transmitter 102. For example, the device 220 can include LEDs 224 and photodiodes 222, which can be part of a photometric front end (such as photometric front end 128) configured to perform photometric measurements. In an example, the photometric measurements can include photoplethysmography measurement to determine a heart rate of a user wearing the electronic device 220. The photoplethysmography measurement can be performed by illuminating the user's skin (when the user is wearing the device 220) by the LEDs 224, and generating an electric signal using the photodiodes 222 based on a reflection of the light from the LEDs 224 by the user's skin. The generated electric signal can be used to detect and measure the user's heart rate.

The charger 208 can include a power connector 206 (e.g., a USB power connector), powering LED 210. The charger 208 may further include a photodiode 212. In an example, power delivery can be achieved when the LED 210 of charger 208 is illuminated and is placed in proximity to the photodiodes 222 of the device 220. In this regard, the photodiodes 222 can be shared for performing photometric functions or generating electrical signals for charging a device battery when the photodiodes 222 are illuminated by the LED 210.

In an example, one or more data communication paths may be established between the charger 208 and the device 220. For example, a data communication path from the charger 208 to the device 220 can be established using the LED 210 of the charger and the photodiodes 222 of the device 220. Another data communication path from the device 220 to the charger 208 can be established using the LEDs 224 of the device 220 and the photodiode 212 of the charger 208. The data communication paths can be used for, e.g., establishing an initial communication (such as a wireless "handshake") as well as to communicate control signals for initiating battery charging or adjusting LED light intensity (for LED 210) based on charge status of a device 220 battery.

FIG. 3A depicts an example optical charging system with shared use of a sensor photodiode, in accordance with an example embodiment. Referring to FIG. 3A, the optical charging system 300 can include a power transmitter (or transmit power management integrated circuit, "Tx PMIC") 302 and a power receiver 304. The power transmitter 302 can include similar components and perform similar functionalities as the power transmitter 102 of FIG. 1. The power receiver 304 can include similar components and perform similar functionalities as the power receiver 104 of FIG. 1. For example, the power transmitter 302 can include a power control block 322, an LED driver block 324 and an optical receiver block 326, which can have functionalities that are similar to the functionalities performed by the power control block 108, the LED driver block 110, and the optical receiver block 112, respectively. The power transmitter may also include an LED 328 and a photodiode (or a photovoltaic cell) 330.

The power receiver 304 can include a receiver power management integrated circuit (Rx PMIC) 306 and an optical sensor front end 308, which can have functionalities that are similar to the functionalities performed by the power management block 120 and the photometric front end 128, respectively. The Rx PMIC 306 can include a voltage regulator block 310, an impedance matching block 312, and a charge management block 314, which can have functionalities that are similar to the functionalities performed by the voltage regulation block 122, the impedance matching block 124, and the charge management block 126, respectively.

In an example, the Rx PMIC 306 can also include an optical transmitter 316. The optical transmitter 316 may comprise suitable circuitry, logic, interfaces and/or code, and can be configured to generate one or more optical signals for transmission to the Tx PMIC 302 via the LED 321. In this regard, the optical transmitter 316 can include one or more digital-to-analog converters (DACs), which can be used to generate the optical signals. Even though the optical transmitter 316 is illustrated as part of the Rx PMIC 306, it may also be implemented as part of the optical sensor 318.

The optical sensor 308 can include a current sensor block 318, an LED driver block 320, a photodiode (or photovoltaic cell) 319, and an LED 321. The current sensor block 318 may comprise suitable circuitry, logic, interfaces and/or code, and can be configured to sense an electric signal generated by the photodiode 319. The LED driver block 320 may comprise suitable circuitry, logic, interfaces and/or code, and can be configured to adjust current and/or voltage supplied to the LED 321 so as to adjust the transmitted light power density.

In an example operation, the photodiode 319 of the optical sensor 308 can be used for photometric sensing (e.g., in connection with LED 321) or for charging the battery 352. During battery charging, the Tx PMIC 302 can activate the LED 328, which can be placed in proximity to the photodiode 319 of the power receiver 304. The photodiode 319 can generate an electric signal, which is sensed by the current sensor 318 of the optical sensor front end 308. The electrical signal can be communicated via communication path 332 to the Rx PMIC 306 for further processing (e.g., by the voltage regulator block 310 or the impedance matching block 312). The charge management block may then use the processed/conditioned electrical signal to charge the battery 352 up to a pre-determined threshold level.

In this regard, by cross-using the photodiode 319, photometric sensing without charging, as well as charging without photometric sensing may be performed by the optical charging system 300.

FIG. 3B depicts an example optical charging system configured to establish a link between a power receiver and a power transmitter via optical communications, in accordance with an example embodiment. Referring to FIG. 3B, the optical charging system 100 can be configured to use an optical communication link between the Tx PMIC 302 and the power receiver 304. In an example, the optical transmitter 316 can use the LED 321 to communicate one or more optical signals to the photodiode 330 in the Tx PMIC 302 via the communication link 342. Communication link 342. may be bi-directional, with the Tx PMIC 302 communicating signals to the Rx PMIC 306 using the LED 328 and the photodiode 319.

Example optical signals may include "handshake" signals for establishing an initial communication between the Tx PMIC 302 and the power receiver 304. Other example optical signals may include charging protocol signals associated with a charging protocol used by the Rx PMIC 306 for charging the battery 352.

FIG. 3C depicts an example optical charging system with feedback control using optical communications, in accordance with an example embodiment. Referring to FIG. 3C, the optical charging system 300 can be configured to use an optical data communication link between the Tx PMIC 302 and the Rx PMIC 306 for power management and control. For example, the charge management block 314 can be configured to obtain charge status information 354 indicative of charge status of the battery 352. The charge status information 354 can be communicated to the Tx PMIC 302 via the communication link 356, established between the LED 321 and the photodiode 330. The optical receiver 326 can receive the charge status information 354, and can generate a control signal 358 based on the charge status information 354. The control signal 358 can be used by the LED driver block 324 to turn the LED 328 ON, OFF, or adjust the intensity of the LED 328 based on the charge status information 354.

In an example, the charge status information 354 can indicate that the battery 352 is charged below a threshold amount. The control signal 358 can then be used to activate the LED 328 or increase the intensity of the LED 328. In another example, the charge status information 354 can indicate that the battery 352 is charged above a threshold amount. The control signal 358 can then be used to decrease the intensity of the charging LED 328 (or deactivate the LED 328).

In an example, the communication of the charge status information 354 and the generation of the control signal 358 can be performed dynamically, e.g., at a pre-determined time interval.

Figure 4:
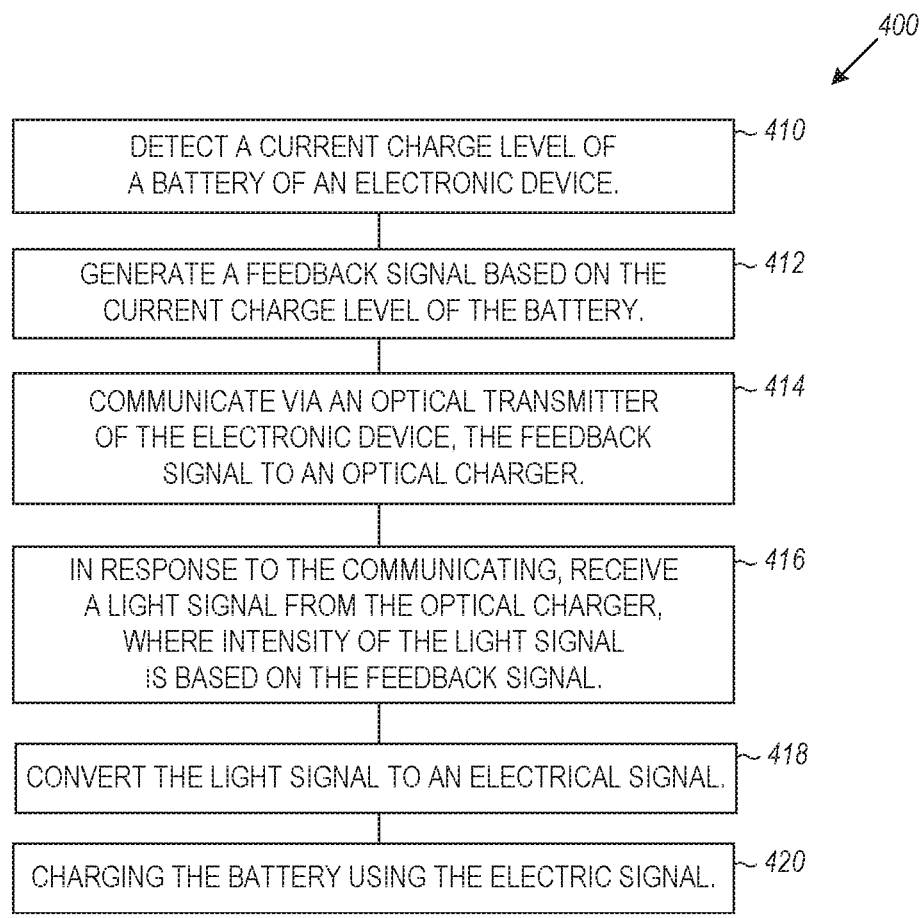
FIG. 4 illustrates a flow diagram of a method for optical charging of an electronic device, in accordance with an example embodiment.

FIG. 4 illustrates a flow diagram of a method for optical charging of an electronic device, in accordance with an example embodiment. Referring to FIG. 4, the example method 400 may start at 410, when a current charge level of a battery of an electronic device can be detected. At 412, a feedback signal can be generated based on the current charge level of the battery. For example, the charge management block 314 can obtain charge status information 354 indicating charge status of the battery 352. At 414, the feedback signal can be communicated to an optical charger via an optical transmitter of the electronic device. For example, the optical transmitter 316 can communicate the charge status information 354 to the optical receiver 326 via the communication link 356 between the LED 321 and the photodiode 330.

At 416, a light signal can be received from the optical charger, in response to the communicating of the feedback signal. For example, in response to the charge status information, a control signal 358 can be generated by the LED driver 324 and used to adjust the intensity of the light signal generated by the LED 328 and used for charging the battery 352. At 418, the light signal generated by the LED 328 can be received by the photodiode 319 and converted to an electrical signal. At 420, the charge management block 314 can use the electrical signal to charge the battery 352.

Various Notes & Aspects

Aspect 1 is an electronic device, comprising: a charge storage device; an optical sensor, comprising an LED and a photodiode, the LED configured to emit light in connection with a photometric measurement, and the photodiode configured to: generate a first electrical signal in response to light received in relation to the photometric measurement; and generate a second electrical signal least in part including energy converted from light received from an optical charger; and a power management circuit configured to receive the second electrical signal and charge the charge storage device at least in part using energy from the second electrical signal.

In Aspect 2, the subject matter of Aspect 1 optionally includes wherein the photodiode is configured to generate the first electrical signal independently of the second electrical signal.

In Aspect 3, the subject matter of any one or more of Aspects 1-2 optionally include wherein the photometric measurement is a photoplethysmography measurement to determine a heart rate of a user wearing the electronic device.

In Aspect 4, the subject matter of any one or more of Aspects 1-3 optionally include wherein the power management circuit further comprises a voltage regulator, the voltage regulator configured to adjust voltage of the second electrical signal.

In Aspect 5, the subject matter of Aspect 4 optionally includes wherein the voltage regulator is configured to adjust the voltage of the second electrical signal based on a present voltage level of the charge storage device.

In Aspect 6, the subject matter of any one or more of Aspects 1-5 optionally include wherein the power management circuit further comprises an impedance matching circuit, the impedance matching circuit configured to adjust voltage level or current level of the second electrical signal to maximize power associated with the second electrical signal.

In Aspect 7, the subject matter of any one or more of Aspects 1-6 optionally include wherein the power management circuit further comprises a charge management circuit, the charge management circuit configured to adjust voltage and/or current of the second electrical signal to prevent charging the charge storage device above a first threshold level.

In Aspect 8, the subject matter of Aspect 7 optionally includes wherein the charge management circuit is further configured to adjust the voltage and/or current of the second electrical signal to prevent discharging of the storage device below a second threshold level.

In Aspect 9, the subject matter of any one or more of Aspects 7-8 optionally include wherein the charge management circuit is further configured to generate a charge status signal reflective of a current charge level of the charge storage device.

In Aspect 10, the subject matter of Aspect 9 optionally includes wherein the power management circuit further comprises an optical transmitter, the optical transmitter configured to: generate a feedback signal based on the charge status signal, the feedback signal for transmission to the optical charger via an optical communication path for adjusting light intensity of the light generated by the optical charger.

In Aspect 11, the subject matter of Aspect 10 optionally includes wherein the LED of the optical sensor is configured to transmit the feedback signal to the optical charger, for reception by a photodiode at the optical charger.

Aspect 12 is an optical charger, comprising: a light source configured to emit light; an optical data receiver configured to receive a feedback signal from an electronic device, the feedback signal indicative of a charge status of a battery of the electronic device; and a driver circuit configured to activate the light source using a power signal from a power source, the light source having a light intensity based on the received feedback signal.

In Aspect 13, the subject matter of Aspect 12 optionally includes wherein the optical data receiver is configured to:

generate a control signal, the control signal for regulating one or both of current level or voltage level of the power signal.

In Aspect 14, the subject matter of Aspect 13 optionally includes wherein the optical data receiver comprises at least one of a photovoltaic film or a photodiode configured to generate the control signal.

In Aspect 15, the subject matter of any one or more of Aspects 12-14 optionally include a power control circuit, the power control circuit configured to limit one or both of current level or voltage level of the power signal generated by the power source.

In Aspect 16, the subject matter of any one or more of Aspects 12-15 optionally include wherein the power source is a universal serial bus (USB) power source.

In Aspect 17, the subject matter of Aspect 16 optionally includes specification.

Aspect 18 is a method for optical charging of an electronic device, the method comprising: detecting a current charge level of a battery of the electronic device; generating a feedback signal based on the current charge level of the battery; communicating via an optical transmitter of the electronic device, the feedback signal to an optical charger; in response to the communicating, receiving a light signal from the optical charger, wherein intensity of the light signal is based on the feedback signal; converting the light signal to an electrical signal; and charging the battery using the electric signal.

In Aspect 19, the subject matter of Aspect 18 optionally includes adjusting voltage level or current level of the electrical signal to prevent charging the battery above a pre-determined threshold level.

In Aspect 20, the subject matter of any one or more of Aspects 18-19 optionally include establishing a communication link with the optical charger using at least another light signal generated by the optical transmitter.

Each of the non-limiting aspects described herein can stand on its own, or can be combined in various permutations or combinations with one or more of the other Aspects.

The above detailed description includes references to the accompanying drawings, which form a part of the detailed description. The drawings show, by way of illustration, specific embodiments in which the invention can be practiced. These embodiments are also referred to herein as "examples" or "aspects." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "compris-ing" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:
1. An electronic device, comprising:
   a charge storage device;
   an optical sensor, comprising an LED and a photodiode, wherein:
      the LED is configured to emit light in a first optical communication path with the photodiode in connection with a photometric measurement indicative of a physiological parameter of a user wearing the electronic device;
      the photodiode is configured to generate a first electrical signal in response to the light emitted by the LED in the first optical communication path, the first electrical signal associated with the physiological parameter of the user; and
      the photodiode is further configured to generate a second electrical signal at least in part including energy converted from light received from an optical charger via a second optical communication path; and a power management circuit configured to receive the second electrical signal and charge the charge storage device at least in part using energy from the second electrical signal.

2. The electronic device of claim 1, wherein the photodiode is configured to generate the first electrical signal independently of the second electrical signal.

3. The electronic device of claim 1, wherein the photometric measurement is a photoplethysmography measurement to determine a heart rate of the user wearing the electronic device.

4. The electronic device of claim 1, wherein the power management circuit further comprises a voltage regulator, the voltage regulator configured to adjust voltage of the second electrical signal.

5. The electronic device of claim 4, wherein the voltage regulator is configured to adjust the voltage of the second electrical signal based on a present voltage level of the charge storage device.

6. The electronic device of claim 1, wherein the power management circuit further comprises an impedance matching circuit, the impedance matching circuit configured to adjust voltage level or current level of the second electrical signal to maximize power associated with the second electrical signal.

7. The electronic device of claim 1, wherein the power management circuit further comprises a charge management circuit, the charge management circuit configured to adjust voltage and/or current of the second electrical signal to prevent charging the charge storage device above a first threshold level.

8. The electronic device of claim 7, wherein the charge management circuit is further configured to adjust the voltage and/or current of the second electrical signal to prevent discharging of the storage device below a second threshold level.

9. The electronic device of claim 7, wherein the charge management circuit is further configured to generate a charge status signal reflective of a current charge level of the charge storage device.

10. The electronic device of claim 9, wherein the power management circuit further comprises an optical transmitter, the optical transmitter configured to:

generate a feedback signal based on the charge status signal, the feedback signal for transmission to the optical charger via a third optical communication path for adjusting light intensity of the light generated by the optical charger, the third optical communication path between the LED of the optical sensor and a photodiode of the optical charger.

11. The electronic device of claim 10, wherein the LED of the optical sensor is configured to transmit the feedback signal to the optical charger via the third optical communication path, for reception by the photodiode at the optical charger.

12. The electronic device of claim 1, wherein the LED of the optical sensor is configured to emit light of a handshake optical signal in a third optical communication path formed between the LED of the optical sensor and a photodiode of the optical charger, the handshake signal to establish an initial communication between the electronic device and the optical charger.

13. An electronic device including a power management circuit configured to generate a charging signal for a charge storage device, the electronic device comprising:

an LED; and a photodiode coupled to the LED via a first optical communication path to form an optical sensor, wherein:

the LED is configured to emit light in the first optical communication path with the photodiode in connection with a photometric measurement indicative of a physiological parameter of a user wearing the electronic device;

the photodiode is configured to generate a first electrical signal in response to the light emitted by the LED in the first optical communication path, the first electrical signal associated with the physiological parameter of the user; and the photodiode is further configured to generate a second electrical signal at least in part including energy converted from light received from an optical charger via a second optical communication path, the second electrical signal comprising the charging signal.

14. The electronic device of claim 13, wherein the LED is configured to emit light of a handshake optical signal in a third optical communication path formed between the LED and a photodiode of the optical charger, the handshake signal to establish an initial communication between the electronic device and the optical charger.

15. The electronic device of claim 13, wherein the photodiode is configured to generate the first electrical signal independently of the second electrical signal.

16. The electronic device of claim 13, wherein the photometric measurement is a photoplethysmography measurement to determine a heart rate of the user wearing the electronic device.

17. The electronic device of claim 13, further comprising:

a charge management circuit, the charge management circuit configured to adjust voltage and/or current of the second electrical signal to prevent charging the charge storage device above a first threshold level.

18. The electronic device of claim 17, wherein the charge management circuit is further configured to:

adjust the voltage and/or current of the second electrical signal to prevent discharging of the storage device below a second threshold level.

19. An electronic device comprising:

means for emitting light in a first optical communication path in connection with a photometric measurement indicative of a physiological parameter of a user wearing the electronic device;

means for generating a first electrical signal in response to the light emitted in the first optical communication path, the first electrical signal associated with the physiological parameter of the user;

means for generating a second electrical signal at least in part including energy converted from light received from an optical charger via a second optical communication path; and means for charging a charge storage device at least in part using energy from the second electrical signal.

20. The device of claim 19, further comprising:

means for to emitting light of a handshake optical signal in a third optical communication path formed between the electronic device and a photodiode of an optical charger, the handshake signal to establish an initial communication between the electronic device and the optical charger.

\* \* \* \* \*